UNITED STATES PATENT OFFICE.

PAUL JULIUS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

BLUE-RED AZO DYE.

No. 833,605.    Specification of Letters Patent.    Patented Oct. 16, 1906.

Application filed April 17, 1906. Serial No. 312,208.

*To all whom it may concern:*

Be it known that I, PAUL JULIUS, doctor of philosophy and chemist, a subject of the Emperor of Austria-Hungary, residing at Ludwigshafen-on-the-Rhine, Kingdom of Bavaria, German Empire, have invented new and useful Improvements in Azo Coloring-Matters, of which the following is a specification.

My invention relates to the manufacture of azo coloring-matters by combining the monoalkyl ethers of 1.4-dihydroxynaphthalene with sulfonated diazo and tetrezo compounds of the benzene and naphthalene series, the coloring-matters so produced yielding from red to violet shades which are fast against the action of light. As a rule, the coloring-matters obtained by employing the ethyl ether of 1.4-dihydroxynaphthalene yields shades which are bluer than those obtained from the corresponding methyl ether and those obtained from monoalkyl ethers—for instance, the monoamyl ether—in which the alkyl group is still larger, produce shades which are still bluer than those yielded by the coloring-matters obtained from the monoethyl ether. My new coloring-matters are further characterized by being soluble in water, giving from red to violet solutions. Upon reduction with tin and hydrochloric acid they yield a monoalkyl ether of amido-dihydroxynaphthalene.

The coloring-matter which I wish to claim specifically is that obtained by combining diazotized metanilic acid with the monoethyl ether of 1.4-dihydroxynaphthalene. It yields a bluish-red solution in water and also dyes wool, giving bluish-red shades.

For the sake of convenience I give two examples showing how the monoalkyl ethers of 1.4-dihydroxynaphthalene can be obtained on a commercial scale—namely, by treating 1.4-dihydroxynaphthalene with alcohol and mineral acid. I make no claim, however, to the production of these ethers, some of which have been prepared previously by Russig. (See *Journal für prak. Chemie*, N. F., 62, 50.) In carrying out the process the etherification must not be allowed to proceed too far, but should be stopped as soon as there is no or practically no dihydroxynaphthalene unacted upon. The parts are by weight.

*Example 1.—Production of the monomethyl ether of 1.4-dihydroxynaphthalene.*—Dissolve fifty (50) parts of 1.4-dihydroxynaphthalene in two hundred and fifty (250) parts of a cold solution of hydrochloric acid in methyl alcohol (containing eighteen (18) grams HCl in one hundred (100) cubic centimeters,) allow the mixture to stand at ordinary temperature for about fifteen (15) hours, precipitate with water, and recrystallize from benzene or ligroin the monomethyl ether which can thus be obtained in the form of colorless needles, melting at a temperature of one hundred and thirty-one (131°) degrees centigrade.

*Example 2.—Production of the monoethyl ether of 1.4-dihydroxynaphthalene.*—Boil together in a reflux apparatus for about thirty (30) minutes one hundred (100) parts of 1.4-dihydroxynaphthalene and three hundred (300) parts of an ethyl alcoholic hydrochloric acid solution (containing three (3) grams of HCl in one hundred (100) cubic centimeters) and work up the reaction product in the manner described in the foregoing Example 1. The monoethyl ether is obtained in colorless needles, which melt at a temperature of about one hundred and five (105) degrees centigrade.

In a similar manner other corresponding ethers can be obtained—for instance, the monoisoamyl ether, which consists of colorless needles and melts at a temperature of ninety-eight (98°) degrees centigrade.

The following example will serve to further illustrate the nature of my invention and a method of carrying it into practical effect; but my invention is not confined to this example. The parts are by weight. Diazotize seventeen and three-tenths (17.3) parts of metanilic acid and allow the diazo solution to run into a solution of seventeen and two-fifths (17.4) parts of the sodium salt of the monomethyl ether of 1.4-dihydroxynaphthalene to which sufficient sodium carbonate has been added to maintain the whole alkaline, at the same time stirring well and keeping the temperature at about zero (0°) centigrade. The combination is complete after a short time and the greater part of the coloring-matter separates out in the form of leaflets with a metallic luster, the remainder being precipitated by the addition of common salt to the solution. It dissolves in water, yielding a bluish-red solution and dyes wool very level bluish-red shades.

The following table gives some of the especially-valuable coloring-matters obtainable according to my invention:

| Monomethyl or monoethyl-ether of 1.4-dihydroxynaphthalene combined with diazotized— | Shade. |
|---|---|
| Metanilic acid | bluish red. |
| Sulfanilic acid | bluish red. |
| 2.4-anilin-disulfo-acid | yellow-red. |
| Toluidine-sulfo-acid $CH_3:SO_3H:NH_2=1:2:4$ | cherry-red. |
| Anisidine-sulfo-acid $OCH_3:SO_3H:NH_2=1:2:4$ | violet-red. |
| 1-acet-p-phenylenediamin-3-sulfo-acid | claret-red. |
| 4-amido-diphenylamin-2-sulfo-acid $NH_2:NHC_6H_5:SO_3H=1:4:3$ | blackish violet. |
| 2-nitro-6-amidophenol-4-sulfo-acid | direct dark violet chromed green. |
| Amido-azobenzene-disulfo-acid | claret-red. |
| 1-4-naphthylamin-sulfo-acid | red-violet. |
| 1.5 " " | red-violet. |
| 1.6 " " | reddish violet. |
| 1.4.6 " disulfo-acid | violet-red. |
| 2.1 " sulfo-acid | ponceau-red. |
| 2.8 " " | amaranth. |
| 2.6.8 " disulfo-acid | amaranth. |
| Benzidin-disulfo-acid | on wool red violet, on cotton violet. |
| Diamidostilbene-disulfo-acid | on wool violet, on cotton blue. |
| 1.5-naphthalene-diamin-2-sulfo-acid | on wool violet. |

Now what I claim is—

1. As new articles of manufacture the azo coloring-matters which can be obtained by combining a monoalkyl ether of 1.4-dihydroxynaphthalene with a hereinbefore-defined diazotized aromatic amin sulfo-acid which coloring-matters are soluble in water yielding from red to violet solutions which dye wool yielding from red to violet shades and which upon reduction with tin and hydrochloric acid yield a monoalkyl ether of amido-dihydroxynaphthalene.

2. As a new article of manufacture the azo coloring-matter which can be obtained by combining the monoethyl ether of 1.4-dihydroxynaphthalene with diazotized metanilic acid, which coloring-matter is soluble in water yielding a bluish-red solution which dyes wool yielding bluish-red shades and which upon reduction with tin and hydrochloric acid yields a monoethyl ether of amido-dihydroxynaphthalene.

In testimony whereof I have hereunto set my hand in the presence of two subscribing witnesses.

PAUL JULIUS.

Witnesses:
ERNEST F. EHRHARDT,
J. ALEC. LLOYD.